US008231155B2

(12) United States Patent
    Arns

(10) Patent No.:     US 8,231,155 B2
(45) Date of Patent:     Jul. 31, 2012

(54) BUMPER SYSTEM FOR MOTOR VEHICLES

(75) Inventor: Wilhelm Arns, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 127 days.

(21) Appl. No.: 12/797,692

(22) Filed: Jun. 10, 2010

(65) Prior Publication Data

US 2010/0327613 A1    Dec. 30, 2010

(30) Foreign Application Priority Data

Jun. 15, 2009   (DE) .......................... 10 2009 025 310

(51) Int. Cl.
    *B60R 19/02*    (2006.01)
(52) U.S. Cl. ........................................................ 293/102
(58) Field of Classification Search .................. 293/133, 293/132, 102, 120, 155; 296/187.09, 204
    See application file for complete search history.

(56) References Cited

U.S. PATENT DOCUMENTS

| | | | | |
|---|---|---|---|---|
| 3,861,110 A * | 1/1975 | Bartlett ...................... | 52/718.05 |
| 4,072,334 A * | 2/1978 | Seegmiller et al. ........... | 293/110 |
| 4,830,416 A * | 5/1989 | Matsuoka .................... | 293/120 |
| 5,139,297 A * | 8/1992 | Carpenter et al. ............ | 293/132 |
| 5,154,462 A * | 10/1992 | Carpenter .................... | 293/120 |
| 5,560,672 A * | 10/1996 | Lim et al. ................... | 296/187.05 |
| 5,722,708 A * | 3/1998 | Jonsson ....................... | 293/102 |
| 5,938,273 A * | 8/1999 | Williams et al. ............. | 296/187.05 |
| 5,941,597 A * | 8/1999 | Horiuchi et al. ............. | 296/203.01 |
| 6,003,274 A * | 12/1999 | Wycech ....................... | 52/232 |
| 6,296,301 B1 * | 10/2001 | Schroeder et al. ........... | 296/187.02 |
| 6,550,847 B2 * | 4/2003 | Honda et al. ................ | 296/146.6 |
| 6,918,621 B2 * | 7/2005 | Seksaria ...................... | 293/133 |
| 6,986,536 B1 * | 1/2006 | Heatherington et al. ...... | 293/102 |
| 7,152,914 B2 * | 12/2006 | Dingman et al. ............. | 296/193.05 |
| 7,407,206 B2 * | 8/2008 | Arns et al. .................. | 293/133 |
| 7,407,219 B2 * | 8/2008 | Glasgow et al. ............. | 296/187.03 |
| 7,510,234 B2 * | 3/2009 | Ameloot et al. ............. | 296/187.12 |
| 7,611,175 B2 * | 11/2009 | Tornberg ...................... | 293/102 |
| 8,016,331 B2 * | 9/2011 | Ralston et al. ............... | 293/120 |

FOREIGN PATENT DOCUMENTS

| | | |
|---|---|---|
| DE | 4413641 C1 | 6/1995 |
| DE | 19956561 A1 | 5/2001 |
| DE | 602005004514 T2 | 1/2009 |
| EP | 0937611 A1 | 8/1999 |

OTHER PUBLICATIONS

German Patent Office, Office Action dated Feb. 22, 2010 (3 pages).

* cited by examiner

*Primary Examiner* — Kiran B Patel
(74) *Attorney, Agent, or Firm* — Price Heneveld LLP

(57) ABSTRACT

A bumper system for a motor vehicle includes a cross-member having a U-shape that opens away from the motor vehicle and includes a pair of outer flanges. At least one crush box is connected with the cross-member and supports the same on the motor vehicle. A closure member is operably connected with the outer flanges of the cross-member, and includes first and second longitudinal segments, each of which has a generally U-shaped configuration which opens toward the cross-member, and includes a base, a pair of legs, and a pair of flanges. A coupling member attaches the first and second segments of the closure member to the outer flanges of the cross-member and includes a connecting bar that extends in a generally vertical plane and is connected with the base of each of the first and second segments.

9 Claims, 3 Drawing Sheets

BUMPER SYSTEM FOR MOTOR VEHICLES

CLAIM OF PRIORITY

Applicants hereby claim the priority benefits under the provisions of 35 U.S.C. §119, basing said claim of priority on German Patent Application Serial No. 10 2009 025 310.6, filed Jun. 15, 2009. In accordance with the provisions of 35 U.S.C. §119 and Rule 55(b), a certified copy of the above-listed German patent application will be filed before grant of a patent.

BACKGROUND OF THE INVENTION

The present invention relates to a bumper system for motor vehicles.

As is known, the main function of bumper systems for motor vehicles is to convert impact energy to deformation energy in a collision with another vehicle or with any stationary or non-stationary obstacle. This limits damage to the motor vehicle.

As a rule, one known embodiment of such a bumper system comprises a cross-member that has a U-shaped cross-section, with the bar portion thereof connected via crush boxes to the longitudinal supports of the motor vehicle. The ends of the leg portions of the cross-member are connected, especially joined, using a closure plate, such that the closure plate prevents the cross-member from opening and/or flattening under a bending load. The profile of the bumper system is closed and thereby achieves high flexural rigidity, while remaining lightweight.

Both steel alloys and aluminum alloys are suitable materials for the cross-member and the closure plate. Furthermore, combinations of these materials are possible.

SUMMARY OF THE INVENTION

One object of the present invention is a bumper system for a motor vehicle such that can be adapted for different sizes of motor vehicles, without significantly changing the design of the cross-member such that it is possible to use largely the same production tools.

This object is attained with the features in claim 1.

Advantageous refinements are the subject-matter of claims 2 through 9.

According to the present invention, the closure plate comprises at least two longitudinal segments that are molded in a U-shape that opposes the cross-member. These longitudinal segments are joined, especially welded, to flange portions of the cross-member via flanges arranged at the ends of their legs. The opposing U-shaped forming of the closure plate is advantageous because if the motor vehicle is in a collision, the bumper system acts earlier and additional energy is absorbed because the closure plate crumples. In order to provide the required flexural rigidity of the bumper system, a V-shaped coupling piece is preferably arranged between the two longitudinal segments to prevent the cross-member from opening and/or flattening. This V-shaped coupling piece has a connecting bar that extends essentially in a vertical plane, with upper and lower ends thereof joined, preferably welded, to the flanges of the cross-member.

The closure plate may also be divided into more than two longitudinal segments, depending on the size and/or type of the motor vehicle. In any case, two successive longitudinal segments are joined via a coupling piece to a connecting bar that is disposed approximately vertically. The coupling pieces are then each attached to the bases of the adjacent longitudinal segments.

The novel closure plate is manufactured by punching, stamping, and forming an appropriately prepared plate.

One advantageous refinement is comprised in that the connecting bar for the V-shaped coupling piece is joined to the bases of the longitudinal segments via spacer legs that extend approximately vertically. Since the spacer legs extend in essentially vertical planes, the longitudinal segments for the closure plate are additionally stiffened against collapsing upwardly or downwardly. These spacer legs are thus the connecting parts for attaching the connecting bar to the bases of the longitudinal segments.

The stiffening effect of the spacer legs can be further enhanced in that the spacer legs are joined to the legs of the longitudinal segments, at least in segments. Thus, the longitudinal edges of the spacer legs may be joined, either across their entire length, or only at portions of their length, to the longitudinal edges of the legs for the longitudinal segments.

The width of the spacer legs is preferably narrower than the length of the connecting bar. The spacer legs may be dimensioned with the same width across their entire extension between the bases of the longitudinal segments and the connecting bars.

However, it is also possible for the spacer legs of the coupling pieces to have a trapezoidal shape. In this case, their width in the areas that connect to the connecting bar is wider than at the areas that connect to the bases of the longitudinal segments.

It is also possible for all of the legs of the longitudinal segments and the cross-member to run in nearly horizontal planes. However, it is more advantageous when the legs of the longitudinal segments run essentially parallel to one another at an angle relative to the horizontal. Then, depending on the type of motor vehicle, it is advantageous for the legs to be inclined upwardly or downwardly.

It is also possible for the flanges of the cross-member and of the longitudinal segments of the closure plate to be inwardly oriented. However, it is more advantageous when the flanges of the cross-member and the flanges of the longitudinal segments are attached to the outsides of the legs and face in opposing directions.

Further, stiffening of the bumper system is attained in that the longitudinal segments are divided into areas of different depths, and their flanges have different widths in these areas. When the depth is greater, the width may be such that it is no longer realistically possible to join the flanges of the closure plate and the cross-member to one another. However, the depth of the longitudinal segments may be increased in these areas.

Finally, it can be useful for a connecting bar to be located adjacent each of the opposing ends of the longitudinal segments. The connecting bars are joined to the flanges of the cross-member and extend approximately vertically. They are connected via spacer legs to the base of the adjacent longitudinal segment. This embodiment is disposed at the end of the bumper system, preferably next to the crush boxes.

These and other advantages of the invention will be further understood and appreciated by those skilled in the art by reference to the following written specification, claims, and appended drawings.

The invention shall be explained in greater detail in the following using the exemplary embodiments depicted in the drawings.

DETAILED DESCRIPTION OF THE PREFERRED EMBODIMENTS

Figure 1:
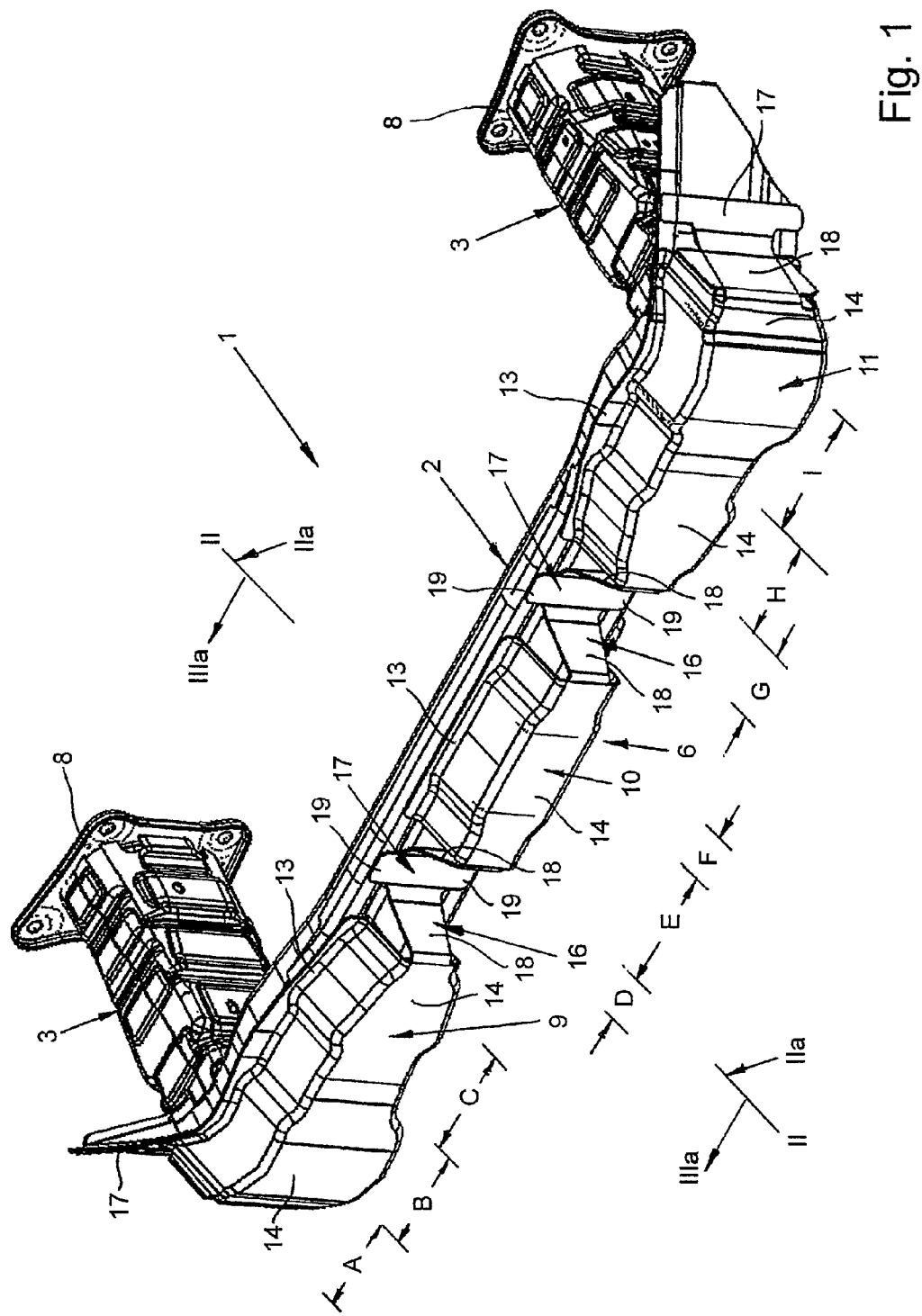
FIG. 1 is a perspective elevation of a bumper system for a motor vehicle system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A bumper system for a motor vehicle (not shown in greater detail) is labeled 1 in FIG. 1.

Figure 2:
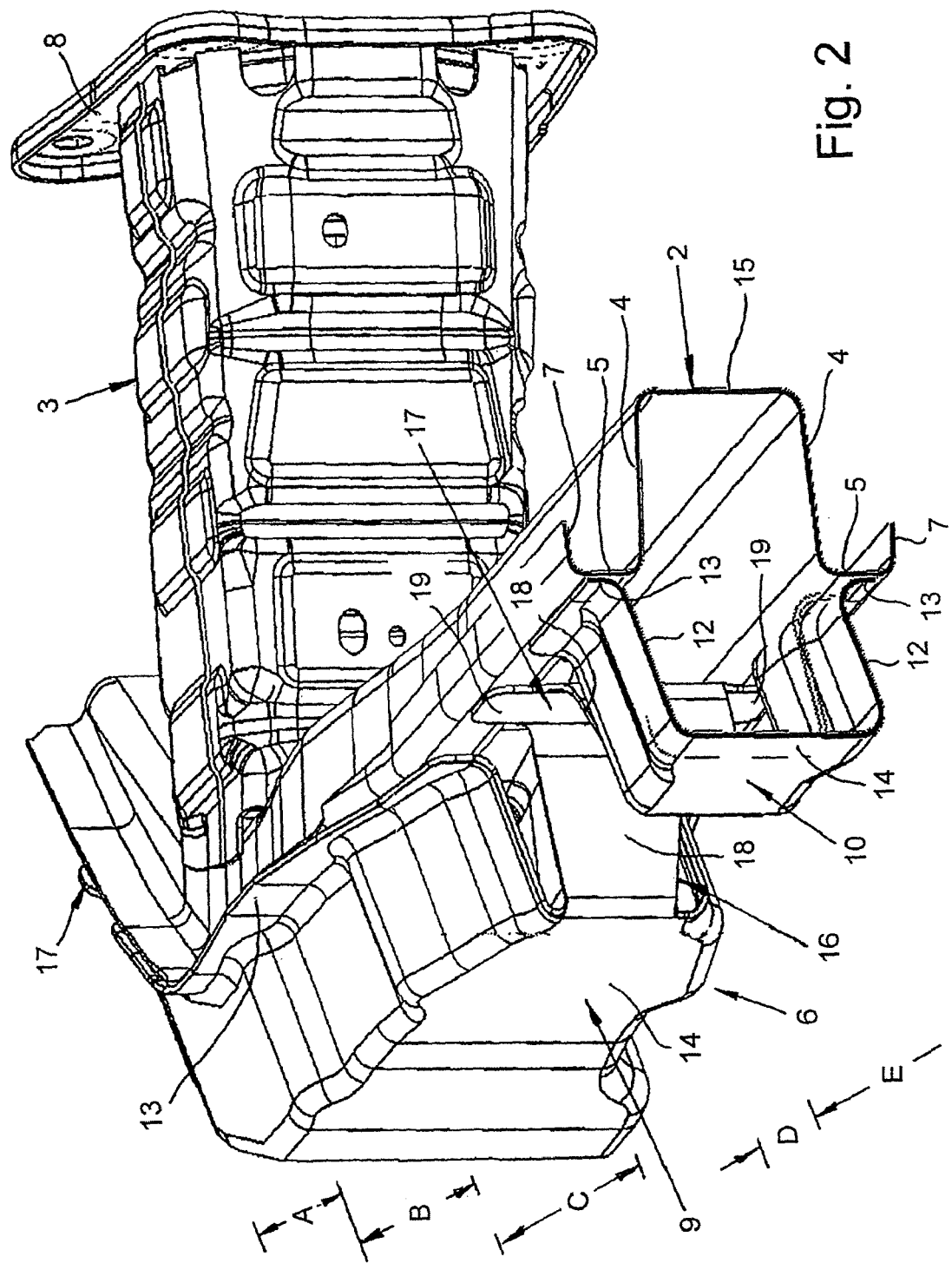
FIG. 2 is a section through the depiction in FIG. 1 along the line II-II as viewed in the direction of arrow IIa, on a larger scale; and, FIG. 3 is a section through the depiction in FIG. 1 along the line III-III as viewed in the direction of the arrow IIIa, again on a larger scale.
Figure 3:
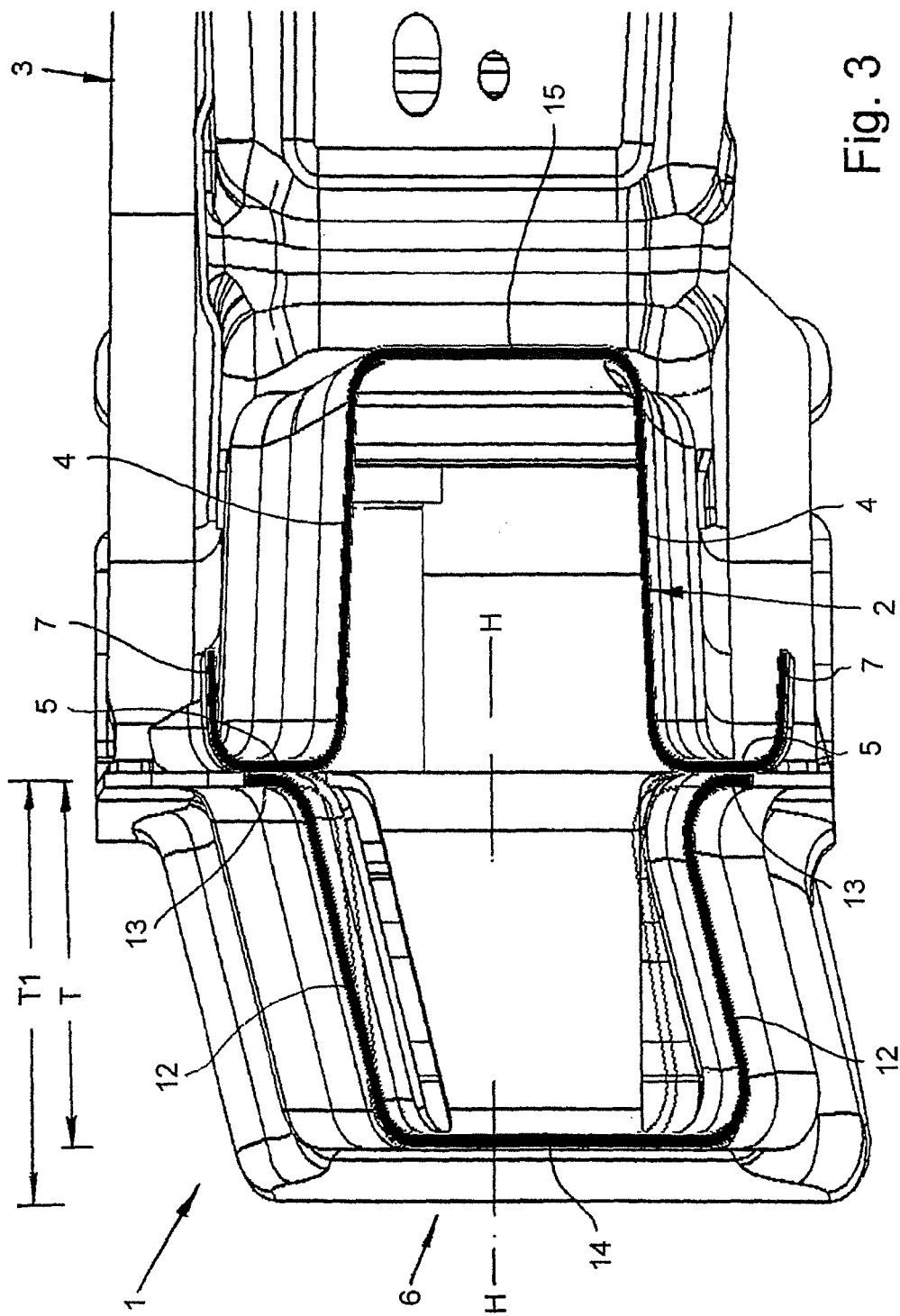

As can be seen in conjunction with FIGS. 2 and 3, the bumper system 1 has a cross-member 2 with a U-shaped cross-section, oriented to open away from the motor vehicle. Bumper system 1 also has crush boxes 3 coupled to the bar portion 15 of the cross-member 2, and a closure plate 6 that is joined to flanges 5 provided on the ends of the legs 4 of the cross-member 2.

The flanges 5 of the cross-member 2 are disposed at the outside portions of the legs 4 and extend upwardly and downwardly. Bars 7 are disposed at the ends of the flanges 5, and run or extend at a slight angle to the legs 4 of the cross-member 2.

The crush boxes 3 are connected to the longitudinal frame supports (not shown in greater detail) of the motor vehicle via flange plates 8.

The closure plate 6 has a generally U-shaped cross-section, oriented to open toward the motor vehicle, in opposition to the cross-member 2, and is divided into three longitudinal segments 9, 10, 11. The longitudinal segments 9, 10, 11 are joined to the flanges 5 of the cross-member 2 via flanges 13 arranged at the ends of the legs 12, and via two vertical connecting bars 17. Each connecting bar 17 is a component of a coupling piece 16 that joins the longitudinal segments 9 and 10 or 10 and 11, and is connected to the base 14 of the longitudinal segments 9, 10, 11. The flanges 13 of the longitudinal segments 9, 10, 11 are disposed at the outside portions of the legs 12 and extend upwardly and downwardly. The connecting bars 17 of the coupling pieces 16 are joined to the bases 14 of the longitudinal segments 9, 10, 11 via spacer legs 18 that extend vertically. The coupling pieces 16 are thus embodied approximately in a V-shape. The spacer legs 18 have a trapezoidal configuration. Their width in the areas connecting to the connecting bars 17 is greater than their width in the areas connecting to the bases 14.

As can be best seen in FIG. 3, the upper and lower legs 12 of the longitudinal segments 9, 10, 11 run or extend essentially parallel to one another and are inclined downwardly at a predetermined angle to the horizontal line H-H.

Furthermore, it can be seen from FIGS. 1 and 3 that the longitudinal segments 9, 10, 11 are divided into areas A-I which have different depths T, $T_1$ in the fore to aft direction, and their flanges 13 in these areas A-I have different widths. In the illustrated example, the wider flanges 13 for the areas B, D, F, and H are preferably welded to the flanges 5 of the cross-member 2, using arc welding, point welding, or the like. The narrower flanges 13 in the areas A, C, E, G and I merely form supports. However, the connecting bars 17 prevent the legs 4 of the cross-member 2 from opening up. The connecting bars 17 are joined, especially welded, via their ends 19 to the flanges 5 of the cross-member 2.

Moreover, it can be seen from FIG. 1 that one of the vertical connecting bars 17 is provided at each opposing end of the outer longitudinal segments 9, 11 of the closure plate 6. These vertical connecting bars 17 are joined to the flanges 5 of the cross-member 2 and are connected via spacer legs 18 to the base 14 of the adjacent longitudinal segment 9, 11. The spacer legs 18 have approximately the same width across their entire width between the connecting bars 17 and the bases 14 of the longitudinal segments 9, 11.

In the foregoing description, it will be readily appreciated by those skilled in the art that modifications may be made to the invention without departing from the concepts disclosed herein. Such modifications are to be considered as included in the following claims, unless these claims by their language expressly state otherwise.

LEGEND

1—Bumper system
2—Cross-member for 1
3—Crush boxes
4—Legs of 2
5—Flanges of 2
6—Closure plate
7—Bars to 5
8—Flange plates
9—Longitudinal segment of 6
10—Longitudinal segment of 6
11—Longitudinal segment of 6
12—Legs of 9, 10, 11
13—Flanges of 9, 10, 11
14—Bases of 9, 10, 11
15—Bar of 2
16—Coupling pieces
17—Connecting bars
18—Spacer bar
19—Ends of 17
A-I—Areas of 9, 10, 11
H-H—Horizontal line
T—Depth
$T_1$—Depth

The invention claimed is:

1. A bumper system for a motor vehicle, comprising:
a cross-member having a generally U-shaped transverse cross-sectional configuration which opens away from the motor vehicle, and includes a pair of outer flanges;
at least one crush box connected with said cross member and configured to operably support said cross-member on the motor vehicle;
a closure member operably connected with said outer flanges of said cross-member, and including first and second longitudinal segments, each having a generally U-shaped transverse cross-sectional configuration which opens toward said cross-member, and includes a base oriented generally vertically, a pair of legs extending rearwardly from opposite portions of said base and a pair of flanges extending generally vertically from opposite portions of said legs, wherein at least a portion of the flanges of each closure member is fixed to the cross-member at the outer flanges of the cross-member; and a coupling member fixedly connected with said base of each of said first and second segments of said closure member, the coupling member attaching said first and second segments of said closure member to said outer flanges of said cross-member, the coupling member including a connecting bar extending in a generally vertical plane and connecting to the outer flanges of the cross-member.

2. A bumper system as set forth in claim 1, wherein:

said coupling member includes a pair of spacer legs that extend approximately vertically and connect said connecting bar to said base of each of said first and second segments of said closure member.

3. A bumper system as set forth in claim 2, wherein:

at least portions of said spacer legs are connected with said legs of said first and second longitudinal segments.

4. A bumper system as set forth in claim 2, wherein:

said spacer legs have a width that is narrower than the length of said connecting bar.

5. A bumper system as set forth in claim 2, wherein:

said spacer legs have a generally trapezoidal shape.

6. A bumper system as set forth in claim 1, wherein:

said legs of said first and second longitudinal segments extend generally parallel to one another in an angle to the horizontal.

7. A bumper system as set forth in claim 1, wherein:

said flanges of said first and second longitudinal segments are attached to outside portions of said legs and face in opposite directions.

8. A bumper system as set forth in claim 1, wherein:

said first and second longitudinal segments are divided into areas that have different depths and different widths.

9. A bumper system as set forth in claim 1, wherein:

connecting bars are disposed on opposite ends of said first and second longitudinal segments, and each of said connecting bars is joined to the outer flanges of said cross-member by a spacer leg, which extends approximately vertically.

* * * * *